(12) United States Patent
Shiraishi

(10) Patent No.: US 7,081,367 B2
(45) Date of Patent: Jul. 25, 2006

(54) MANUFACTURING METHOD OF THIN-FILM MAGNETIC HEAD WITH MAGNETORESISTIVE EFFECT ELEMENT AND MANUFACTURING METHOD OF HEAD GIMBAL ASSEMBLY WITH THE THIN-FILM MAGNETIC HEAD

(75) Inventor: Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 189 days.

(21) Appl. No.: 10/812,872

(22) Filed: Mar. 31, 2004

(65) Prior Publication Data
US 2004/0266033 A1   Dec. 30, 2004

(30) Foreign Application Priority Data
Jun. 24, 2003   (JP) ............................. 2003-179678

(51) Int. Cl.
*H01L 21/00* (2006.01)

(52) U.S. Cl. .......................... 438/3; 360/245; 360/313; 360/323; 438/460

(58) Field of Classification Search .................... None
See application file for complete search history.

(56) References Cited

U.S. PATENT DOCUMENTS

| 5,465,186 A | * | 11/1995 | Bajorek et al. ............ 360/323 |
| 2002/0034050 A1 | * | 3/2002 | Fujiwara et al. ......... 360/244.1 |
| 2003/0151858 A1 | * | 8/2003 | Hsiao et al. ................ 360/323 |

* cited by examiner

*Primary Examiner*—Asok Kumar Sarkar
(74) *Attorney, Agent, or Firm*—Oblon, Spivak, McClelland, Maier & Neustadt, P.C.

(57) ABSTRACT

A manufacturing method of a thin-film magnetic head with an MR element or a manufacturing method of an HGA with the head includes a step of forming a plurality of MR elements on a substrate or wafer, a step of forming a plurality of pairs of connection pads, each pair of connection pads being electrically connected across each MR element, a step of forming a plurality of thin-film short-circuit patterns on a surface of the wafer, each short-circuit electrically short-circuiting between each pair of connection pads, and a step of thereafter breaking each short-circuit pattern by laser radiation during a predetermined manufacturing process of the magnetic head.

5 Claims, 4 Drawing Sheets

MANUFACTURING METHOD OF THIN-FILM MAGNETIC HEAD WITH MAGNETORESISTIVE EFFECT ELEMENT AND MANUFACTURING METHOD OF HEAD GIMBAL ASSEMBLY WITH THE THIN-FILM MAGNETIC HEAD

BACKGROUND OF THE INVENTION

1. Field of the Invention

The present invention relates to a manufacturing method of a thin-film magnetic head provided with a magnetoresistive effect (MR) element and to a manufacturing method of a head gimbal assembly (HGA) provided with the thin-film magnetic head.

2. Description of the Related Art

Recently, a high sensitivity magnetic head has been demanded as the increase in the recording density of a hard disk drive (HDD). In order to satisfy such demand, a thin-film MR head provided with a giant magnetoresistive effect (GMR) element utilizing the spin valve effect for example, or a tunnel magnetoresistive effect (TMR) element has been proposed.

Such high sensitivity MR head is extremely vulnerable to electro-static discharge (ESD), and thus if it is fabricated with opened electrode terminals of the MR element, ESD destruction or deterioration in its performance may occur during the manufacturing processes. This tendency has been accelerated when the recording density of the magnetic disk reaches and exceeds a value corresponding to the recording capacity of 80 G bytes per platter.

Japanese patent publication No. 10269534A discloses a method for preventing the ESD destruction or deterioration in the performance of a spin valve MR head by electrically connecting a short circuit between a pair of lead conductors of each MR element formed on a wafer during the wafer process, then cutting the wafer into bar members each of which has magnetic head sliders aligned, and thereafter cutting the short circuit when each of the bar members is cut and separated into individual magnetic head sliders.

However, according to this known method, it is necessary to design each short-circuit pattern so that the patterned short circuit can be surely cut when the bar member is cut and separated into individual magnetic head sliders. The pattern therefore has to be elongated causing the wafer surface to correspondingly occupy. This reduces the effective utilization factor of the wafer surface. Also, according to the known method, the MR element can be prevented from the ESD destruction by short-circuiting only before the bar member is cut and separated into individual magnetic head sliders, and therefore, during fabrication processes after that, another protection scheme is required to prevent the MR element from the ESD destruction.

BRIEF SUMMARY OF THE INVENTION

It is therefore an object of the present invention to provide a manufacturing method of a thin-film magnetic head with an MR element and a manufacturing method of an HGA with the thin-film magnetic head, whereby a protection against the ESD destruction or deterioration of the MR element can be achieved without redundantly occupying a wafer surface.

Another object of the present invention is to provide a manufacturing method of a thin-film magnetic head with an MR element and a manufacturing method of an HGA with the thin-film magnetic head, whereby a protection against the ESD destruction or deterioration of the MR element is certainly available until the HGA is assembled.

According to the present invention, a manufacturing method of a thin-film magnetic head with an MR element includes a step of forming a plurality of MR elements on a substrate or wafer, a step of forming a plurality of pairs of connection pads, each pair of connection pads being electrically connected across each MR element, a step of forming a plurality of thin-film short-circuit patterns on a surface of the wafer, each short-circuit electrically short-circuiting between each pair of connection pads, and a step of thereafter breaking each short-circuit pattern by laser radiation during a predetermined manufacturing process of the magnetic head.

Also, according to the present invention, a manufacturing method of an HGA with a thin-film magnetic head having an MR element includes a step of forming a plurality of MR elements on a substrate or wafer, a step of forming a plurality of pairs of connection pads, each pair of connection pads being electrically connected across each MR element, a step of forming a plurality of thin-film short-circuit patterns on a surface of the wafer, each short-circuit electrically short-circuiting between each pair of connection pads, and a step of thereafter breaking each short-circuit pattern by laser radiation during a predetermined manufacturing process of the magnetic head.

Since the short-circuit pattern is broken by the laser radiation, this breaking process can be easily achieved during any manufacturing process. Also, since the short-circuit pattern can be formed at any position so long as a laser beam can be radiated thereto, any ESD destruction or deterioration of the MR element can be prevented so that a stable and high quality product can be provided. Thus, improved yields and a low manufacturing cost can be expected without redundantly occupying a wafer surface and thus without reducing the effective utilization factor of the wafer surface.

It is preferred that the method further includes a step of cutting the wafer into a plurality of bar members so that the plurality of MR elements are aligned on each bar member, and that the predetermined manufacturing process is a process performed with respect to the bar member.

It is also preferred that the method further includes a step of cutting the wafer into a plurality of bar members so that the plurality of MR elements are aligned on each bar member, and a step of cutting and separating each bar member into a plurality of individual magnetic head sliders, and that the predetermined manufacturing process is a process performed with respect to the individual magnetic head slider.

It is further preferred that the method further includes a step of cutting the wafer into a plurality of bar members so that the plurality of MR elements are aligned on each bar member, a step of cutting and separating each bar member into a plurality of individual magnetic head sliders and a step of assembling each individual magnetic head slider with a support member to form the HGA, and that the predetermined manufacturing process is a process performed with respect to the HGA. In this case, the ESD protection can be kept until the HGA is finished.

It is preferred that each short-circuit pattern has a strip shape linearly connecting each pair of connection pads. Thus, the shape the short-circuit pattern is most simplified and this pattern is not redundantly occupy a wafer surface. Therefore, reduction of the effective utilization factor of the wafer surface can be prevented.

It is also preferred that the short-circuit pattern forming step includes sputtering or depositing a good conductor layer, and etching the good conductor layer. In this case, the good conductor layer may be a gold, aluminum or platinum layer.

It is further preferred that each short-circuit pattern has a thickness of 0.1–10 μm.

Further objects and advantages of the present invention will be apparent from the following description of the preferred embodiments of the invention as illustrated in the accompanying drawings.

DETAILED DESCRIPTION OF THE INVENTION

Figure 1:
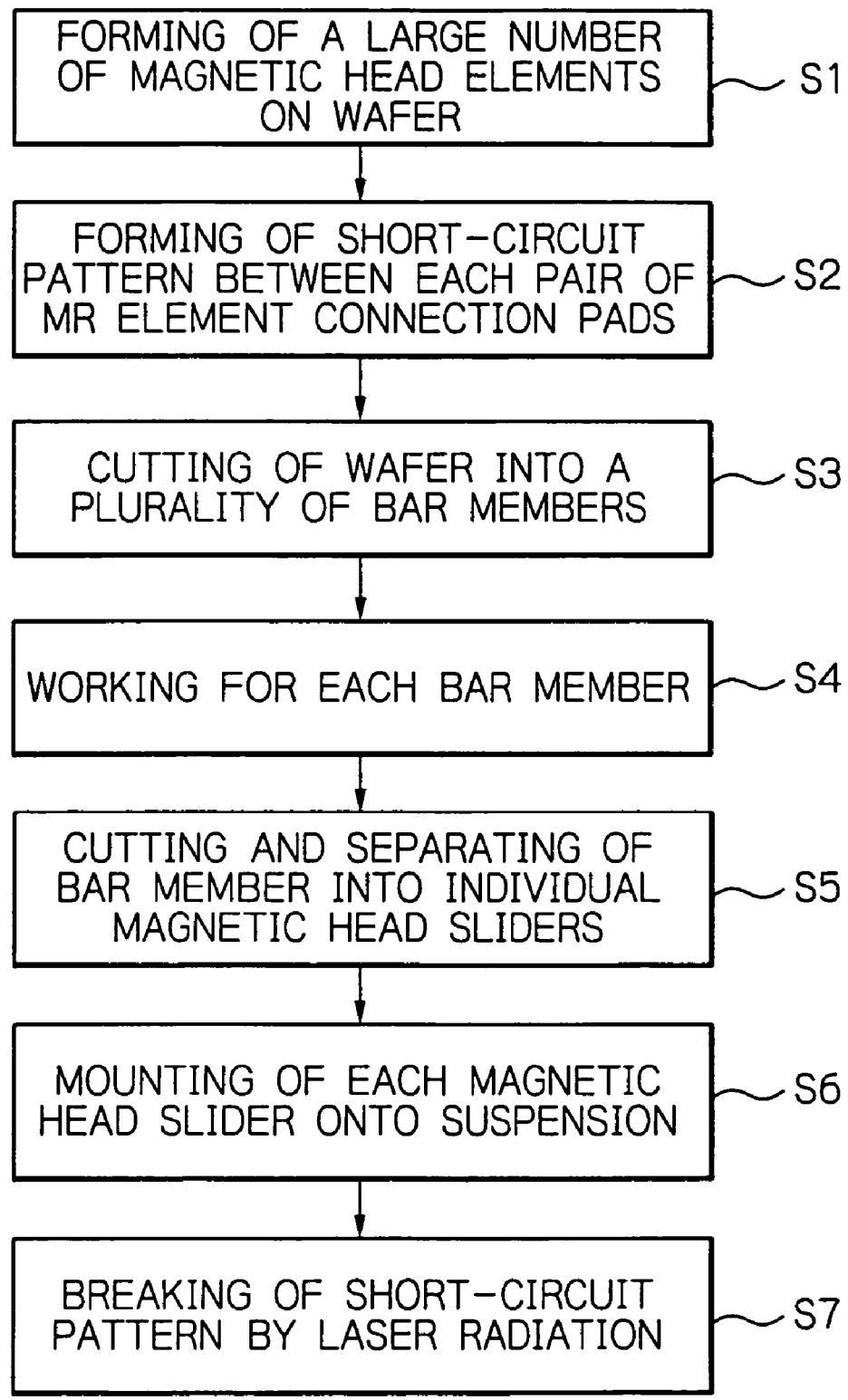
FIG. 1 shows a flow chart schematically illustrating a part of processes in a manufacturing method of an HGA as a preferred embodiment according to the present invention.

FIG. 1 schematically illustrates a part of processes in a manufacturing method of an HGA as a preferred embodiment according to the present invention. Hereinafter, fabrication processes of the HGA in this embodiment will be described in detail with reference to this figure.

First, a large number of thin-film magnetic head elements arranged in matrix are formed on a substrate or wafer (step S1). Each of the thin-film magnetic head elements may be constituted by an MR read head element and an inductive write head element. In this wafer process, a large number pairs of thin-film connection pads electrically connected across the large number of thin-film head elements via lead conductors are also formed.

At the final step performed after the probe test step in this wafer process, formed is a short-circuit pattern establishing an electrical short circuit between each pair of MR element connection pads electrically connected across each MR read head element (step S2).

In this step S2, a good conductor layer provided with a thickness of 0.1–10 μm for example and made of a non-corroding metal material such as gold (Au), aluminum (Al) or platinum (Pt) for example is formed by sputtering or deposition at first. Then, this layer is etched to form the short-circuit pattern.

Figure 2A:
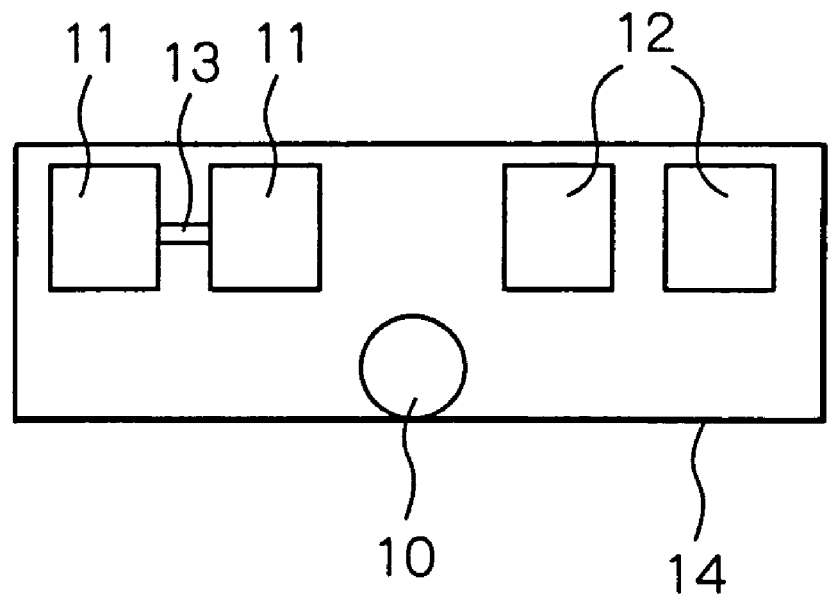
FIGS. 2a and 2b show plane views of a magnetic head slider seen from an element forming face in order to illustrate a short-circuit pattern and breaking of the pattern in the embodiment shown in FIG. 1.

FIG. 2a shows a plane view of a magnetic head slider seen from an element forming face to illustrate thus formed short-circuit pattern. In the figure, reference numeral 10 denotes the thin-film head element, 11 denotes the pair of MR element connection pads electrically connected across the MR read head element, 12 denotes the pair of inductive element connection pads electrically connected across the inductive write head element, 13 denotes the short-circuit pattern connected between the pair of MR element connection pads, and 14 denotes an air bearing surface (ABS) of the magnetic head slider, respectively. As will be apparent from this figure, the short-circuit pattern 13 has a linear strip shape and formed between the pair of the MR element connection pads 11 so as to electrically connect these pads 11 in the shortest distance.

Then, the wafer is cut into a plurality of bar members (step S3). A plurality of thin-film magnetic head elements are aligned on each of the bar members.

Then, various work processes such as lapping, grooving and rail-forming for each bar member are performed (step S4).

Each bar member is then cut and separated into individual magnetic head sliders (step S5).

Thereafter, each separated magnetic head sliders is mounted on each suspension preliminarily fabricated, and the connection pads of the slider are electrically bonded to trace conductor pads preliminarily formed on the suspension, so as to make an HGA (step S6).

Then, laser beam is radiated from a laser source such as a YAG laser source for example onto the short-circuit pattern of each magnetic head slider assembled in the HGA so as to trim and break the short-circuit pattern (step S7).

Figure 2B:
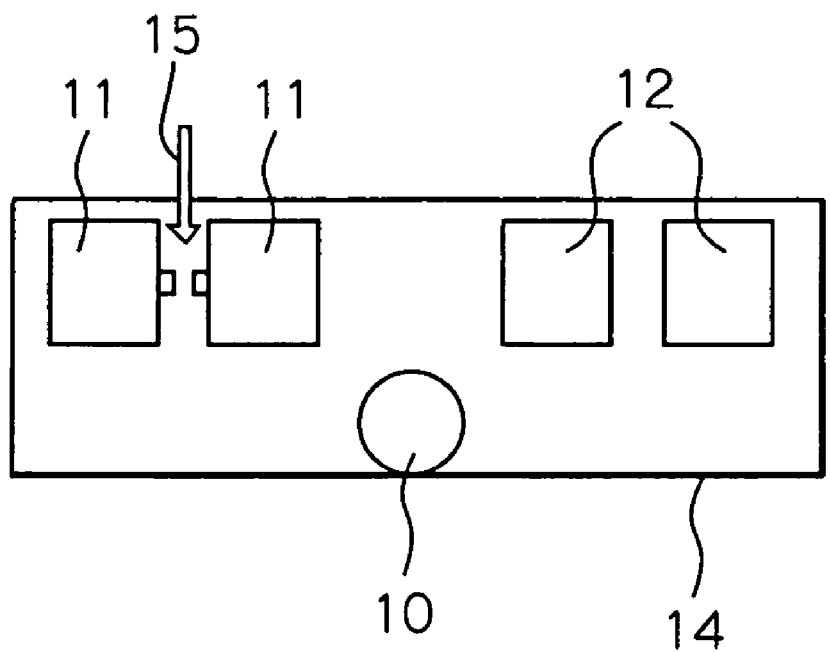

FIG. 2b shows a plane view of the magnetic head slider seen from the element forming face to illustrate breaking of the short-circuit pattern. As shown in the figure, a laser beam 15 is radiated onto the short-circuit pattern 13 to break it.

According to the above-mentioned embodiment, since both ends of the MR head element is electrically short-circuited by the short-circuit pattern until the HGA is assembled or finished, any ESD destruction or deterioration of the MR head element can be prevented so that a stable and high quality product can be provided with improved yields and a low manufacturing cost. Also, if trace conductors connected to the MR element connection pads and disposed on the HGA are short-circuited, it will be possible to keep the ESD protection effective until the HGA is mounted in a HDD. Furthermore, since the short-circuit pattern has a linear strip shape and formed between the pair of the MR element connection pads so as to electrically connect these pads in the shortest distance, the short-circuit pattern will not redundantly occupy a wafer surface. Therefore, reduction of the effective utilization factor of the wafer surface can be prevented. In addition, since the short-circuit pattern is broken by the laser radiation, this breaking process will be performed in a noncontact manner and thus this breaking process can be easily achieved after the magnetic head slider is assembled as the HGA.

Figure 3:
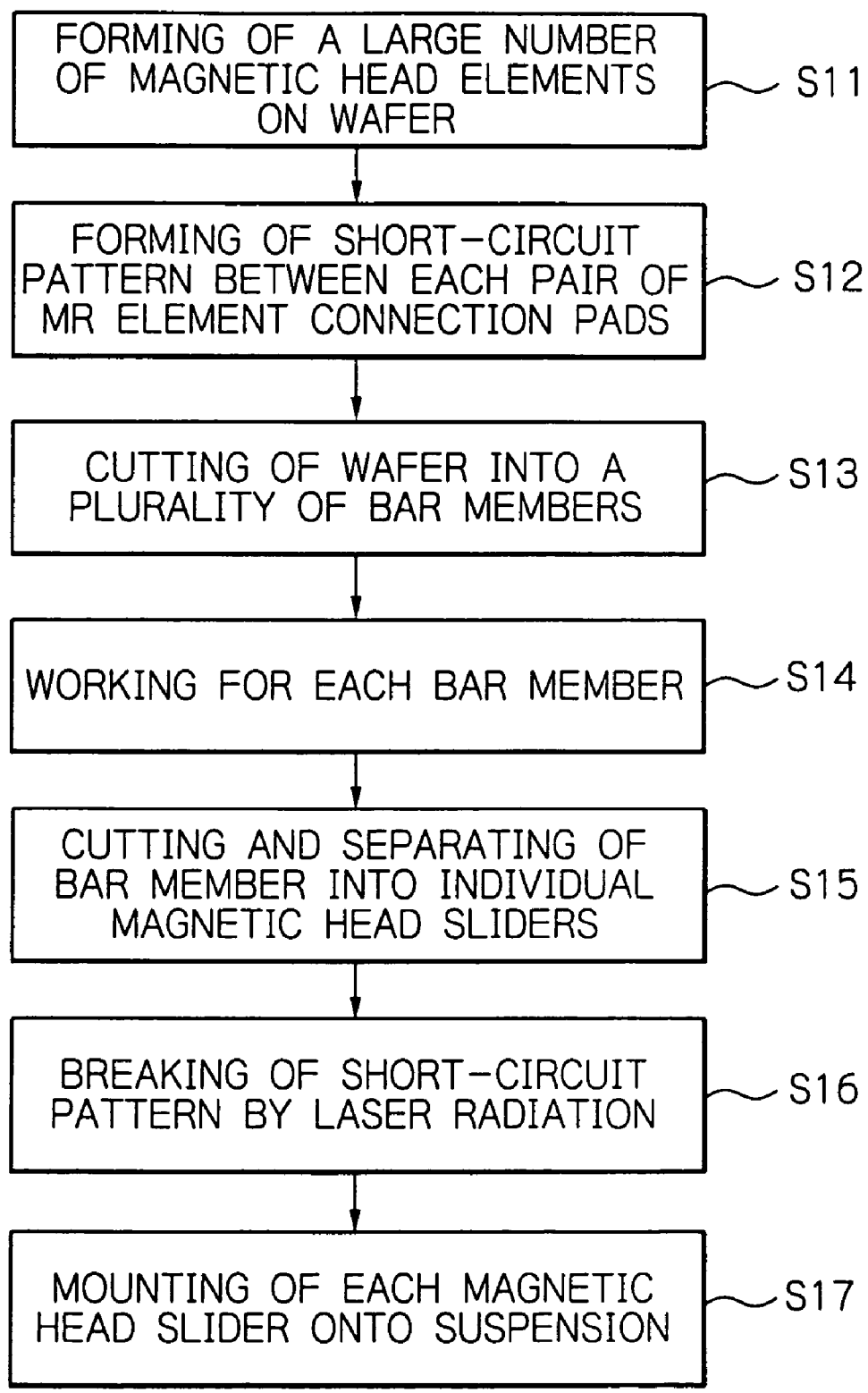
FIG. 3 shows a flow chart schematically illustrating a part of processes in a manufacturing method of an HGA as another embodiment according to the present invention.

FIG. 3 schematically illustrates a part of processes in a manufacturing method of an HGA as another embodiment according to the present invention. Hereinafter, fabrication processes of the HGA in this embodiment will be described in detail with reference to this figure.

First, a large number of thin-film magnetic head elements arranged in matrix are formed on a substrate or wafer (step S11). In this wafer process, a large number pairs of thin-film connection pads electrically connected across the large number of thin-film head elements via lead conductors are also formed.

At the final step performed after the probe test step in this wafer process, formed is a short-circuit pattern establishing an electrical short circuit between each pair of MR element connection pads electrically connected across each MR read head element (step S12).

In this step S12, a good conductor layer provided with a thickness of 0.1–10 μm for example and made of a non-corroding metal material such as gold (Au), aluminum (Al) or platinum (Pt) for example is formed by sputtering or deposition at first. Then, this layer is etched to form the short-circuit pattern.

Then, the wafer is cut into a plurality of bar members (step S13). A plurality of thin-film magnetic head elements are aligned on each of the bar members.

Then, various work processes such as lapping, grooving and rail-forming for each bar member are performed (step S14).

Each bar member is then cut and separated into individual magnetic head sliders (step S15).

Then, laser beam is radiated from a laser source such as a YAG laser source for example onto the short-circuit pattern of each magnetic head slider so as to trim and break the short-circuit pattern (step S16).

Thereafter, each separated magnetic head sliders is mounted on each suspension preliminarily fabricated, and the connection pads of the slider are electrically bonded to trace conductor pads preliminarily formed on the suspension, so as to make an HGA (step S17).

According to this embodiment, the short-circuit pattern is broken before the individually separated magnetic head slider is assembled in the HGA. Thus, no ESD protection is available during the HGA assembling process. However, before this HGA assembling process, since both ends of the MR head element is electrically short-circuited by the short-circuit pattern, any ESD destruction or deterioration of the MR head element can be prevented so that a stable and high quality product can be provided with improved yields and a low manufacturing cost. Also, since the short-circuit pattern has a linear strip shape and formed between the pair of the MR element connection pads so as to electrically connect these pads in the shortest distance, the short-circuit pattern will not redundantly occupy a wafer surface. Therefore, reduction of the effective utilization factor of the wafer surface can be prevented. Furthermore, since the short-circuit pattern is broken by the laser radiation, this breaking process will be performed in a noncontact manner and thus this breaking process can be easily achieved for the individually separated magnetic head slider before assembling.

Figure 4:
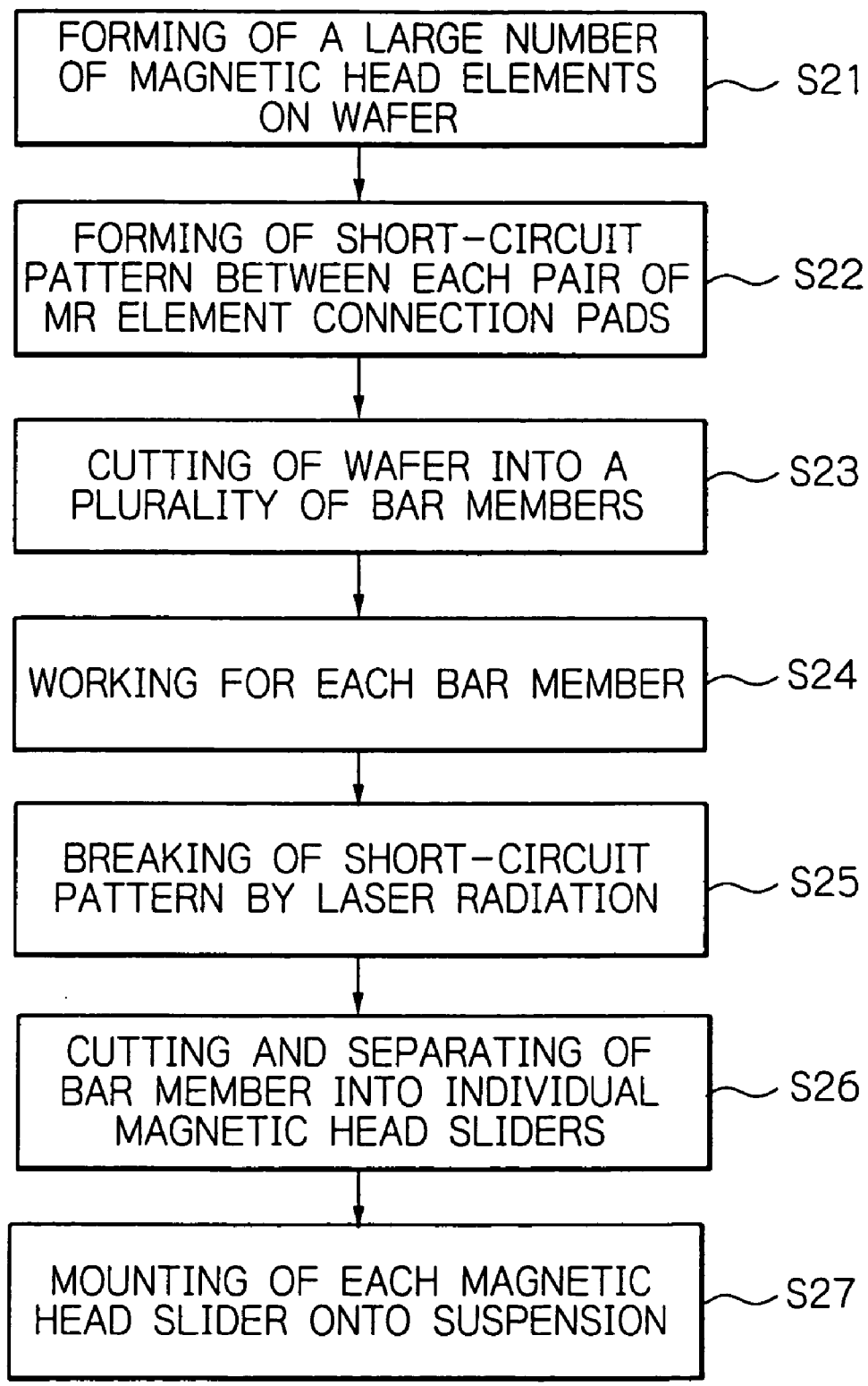
FIG. 4 shows a flow chart schematically illustrating a part of processes in a manufacturing method of an HGA as a further embodiment according to the present invention.

FIG. 4 schematically illustrates a part of processes in a manufacturing method of an HGA as further embodiment according to the present invention. Hereinafter, fabrication processes of the HGA in this embodiment will be described in detail with reference to this figure.

First, a large number of thin-film magnetic head elements arranged in matrix are formed on a substrate or wafer (step S21). In this wafer process, a large number pairs of thin-film connection pads electrically connected across the large number of thin-film head elements via lead conductors are also formed.

At the final step performed after the probe test step in this wafer process, formed is a short-circuit pattern establishing an electrical short circuit between each pair of MR element connection pads electrically connected across each MR read head element (step S22).

In this step S22, a good conductor layer provided with a thickness of 0.1–10 μm for example and made of a non-corroding metal material such as gold (Au), aluminum (Al) or platinum (Pt) for example is formed by sputtering or deposition at first. Then, this layer is etched to form the short-circuit pattern.

Then, the wafer is cut into a plurality of bar members (step S23). A plurality of thin-film magnetic head elements are aligned on each of the bar members.

Then, various work processes such as lapping, grooving and rail-forming for each bar member are performed (step S24).

Laser beam is then radiated from a laser source such as a YAG laser source for example onto the short-circuit patterns of the respective magnetic head sliders on each bar member so as to trim and break the short-circuit patterns (step S25).

Then, each bar member is cut and separated into individual magnetic head sliders (step S26).

Thereafter, each separated magnetic head sliders is mounted on each suspension preliminarily fabricated, and the connection pads of the slider are electrically bonded to trace conductor pads preliminarily formed on the suspension, so as to make an HGA (step S27).

According to this embodiment, the short-circuit pattern is broken before the bar member is cut and separated into individually separated magnetic head sliders. Thus, no ESD protection is available during the HGA manufacturing processes thereafter. However, before the bar cutting process, since both ends of the MR head element is electrically short-circuited by the short-circuit pattern, any ESD destruction or deterioration of the MR head element can be prevented so that a stable and high quality product can be provided with improved yields and a low manufacturing cost. Also, since the short-circuit pattern has a linear strip shape and formed between the pair of the MR element connection pads so as to electrically connect these pads in the shortest distance, the short-circuit pattern will not redundantly occupy a wafer surface. Therefore, reduction of the effective utilization factor of the wafer surface can be prevented. Furthermore, since the short-circuit pattern is broken by the laser radiation, this breaking process will be performed in a noncontact manner and thus this breaking process can be easily achieved for the individually separated magnetic head slider before assembling.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A manufacturing method of a head gimbal assembly with a thin-film magnetic head provided with a magnetoresistive effect element comprising:
    forming a plurality of magnetoresistive effect elements on a wafer;
    forming a plurality of pairs of connection pads, each pair of connection pads being electrically connected across each magnetoresistive effect element;
    forming a plurality of thin-film short-circuit patterns on a surface of said wafer, each short-circuit electrically short-circuiting between each pair of connection pads;
    cutting said wafer into a plurality of bar members so that the plurality of magnetoresistive effect elements are aligned on each bar member;
    cutting and separating each bar member into a plurality of individual magnetic head sliders;
    assembling each individual magnetic head slider with a support member to form the head gimbal assembly; and
    thereafter breaking each short-circuit pattern by laser radiation during a subsequent manufacturing process of the magnetic head.

2. The manufacturing method as claimed in claim 1, wherein each short-circuit pattern has a strip shape linearly connecting each pair of connection pads.

3. The manufacturing method as claimed in claim 1, wherein the short-circuit pattern forming step includes sputtering or depositing a good conductor layer, and etching the good conductor layer.

4. The manufacturing method as claimed in claim 3, wherein said good conductor layer is a gold, aluminum or platinum layer.

5. The manufacturing method as claimed in claim 1, wherein each short-circuit pattern has a thickness of 0.1–10 μm.

* * * * *